Dec. 20, 1932.  J. JOHNSTON ET AL  1,891,820
DESCALING OF TUBES
Filed Jan. 17, 1931
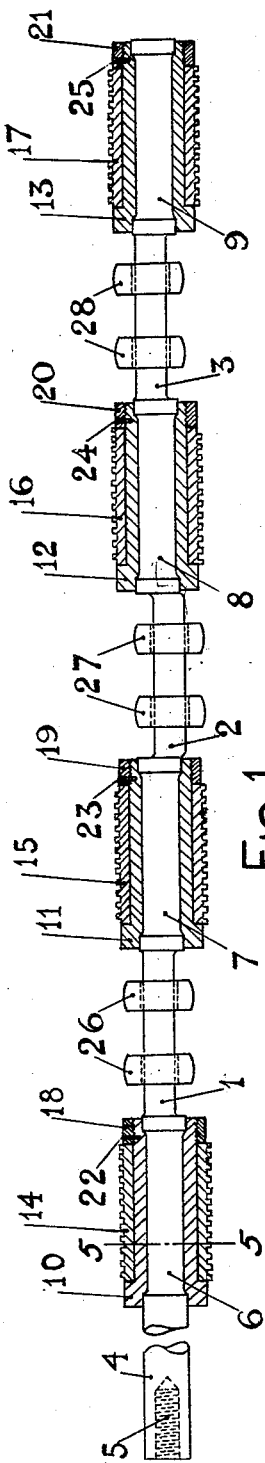
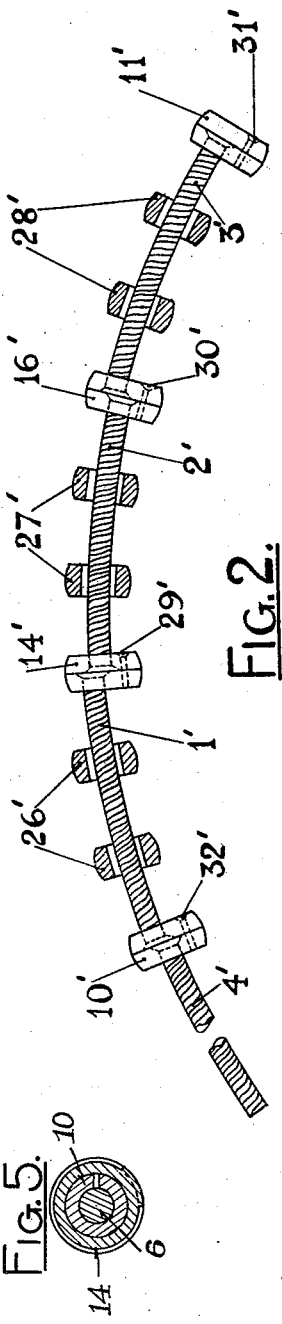
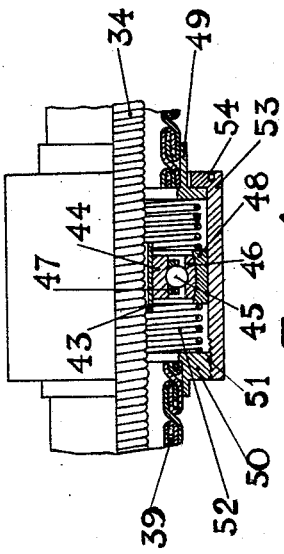
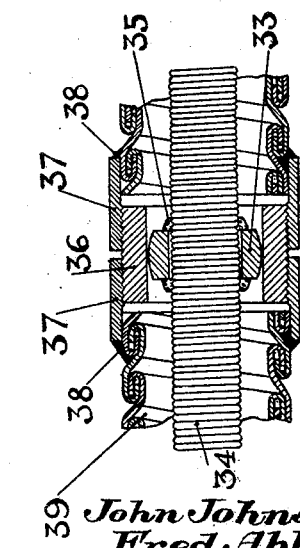
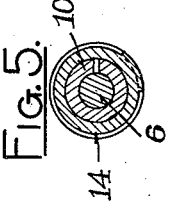
INVENTORS
John Johnston,
Fred Ablard,
BY K. P. McElroy
HIS ATTORNEY Patented Dec. 20, 1932

1,891,820

UNITED STATES PATENT OFFICE

JOHN JOHNSTON AND FRED ABLARD, OF NORTON-ON-TEES, ENGLAND, ASSIGNORS TO IMPERIAL CHEMICAL INDUSTRIES LTD., A CORPORATION OF GREAT BRITAIN

DESCALING OF TUBES

Application filed January 17, 1931, Serial No. 509,470, and in Great Britain January 17, 1930.

The present invention relates to the descaling of metal tubes employed in apparatus such as boiler feed water evaporators, locomotive boilers, marine boilers, or any other vessel having metal tubes which are used for heat interchange purposes. The present invention relates to the descaling of the external surfaces of such tubes.

In the method of descaling tubes according to the present invention the tubes are set in vibration by a high frequency internal hammering thereof.

The invention further consists in a method of descaling the external surfaces of condenser tubes or similar asemblages of tubes without disassembly thereof which consists in causing the tubes to vibrate at a very high frequency so that the scale is dislodged therefrom.

The vibration may be caused by an internal rotary member carrying strikers, and adapted to be rotated at a very high speed, which is preferably not less than 10,000 R. P. M.

In one form of construction used for straight tubes only one or more cranks of small throw are formed on a rotary shaft, and one or more loosely fitting rings or collars are provided on each crank. In another form of construction used for straight or curved tubes one or more eccentrically mounted flexible shafts may be coupled together via bearings and each eccentrically mounted flexible shaft may be provided with one or more loosely fitting rings or collars.

The invention is illustrated in the accompanying drawing, of which Figures 1 and 2 represent two different types of tool, adapted for descaling straight and curved tubes respectively, while Figures 3 and 4 show two different types of bearings for high speed flexible shafts. Fig. 5 is a sectional view of the bearing taken along line 5—5 of Fig. 1.

In the form of the apparatus shown in Figure 1 the tool consists of a shaft having a number of cranks, 1, 2 and 3 pitched equally around 360°. On the end of the shaft a tail piece 4 is provided and this tail piece has a hole 5 tapped in it for the reception of the driving spindle. The thread of the hole 5 should be right-hand, if the direction of rotation is to be clockwise, and left-hand if counter-clockwise. On the shaft there are formed journals, 6, 7, 8 and 9, which are concentric with, and have a sliding fit in the tubes to be descaled. The shaft consists of a solid bar and may be made of case-hardened mild steel, or it may be manufactured from any material having a high tensile strength.

The bearings are each composed of four parts namely 10, 11, 12, 13 which are split type bushings, 14, 15, 16, 17 which are solid or one-piece outer liners, 18, 19, 20, 21 which are screwed retaining rings, and 22, 23, 24, 25 which are grub screws. The split bushings 10, 11, 12, 13 are made in halves and the outer surfaces are made a sliding fit within the liners 14, 15, 16, 17. At one end, the split bushings are stepped to prevent axial movements of the outer liners, and at the other end the bushings are provided with a fine thread for the reception of the retaining rings. The bushings should be made of phosphor bronze while the outer liners, 14, 15, 16, 17 may be made of case hardened mild steel.

The grub screws 22, 23, 24, 25 are inserted to prevent the retaining rings from working loose under vibration.

To facilitate entry and exit to and from the tube to be cleaned, the outer liners 14, 15, 16, 17 are slightly larger in diameter at the center than at both ends. The outside diameter of the liners is made a sliding fit within the tube to be cleaned.

On each crank there are one or more solid case hardened collars 26, 27, 28. The inside diameter of the collars is such that it is possible to pass them over the cranks 1, 2, 3 and the journals 6, 7, 8, 9. The outside diameter of the collars is determined by the eccentricity of the cranks and by the internal diameter of the tube to be cleaned.

In certain circumstances it is found that the tube being cleaned shows a tendency to rotate under the influence of the descaling tool. This tendency may be overcome by providing a shallow screw thread cut on the outer surfaces of the liners 14, 15, 16, 17, the thread being left handed when the tool is rotated counter clockwise and vice versa. Preferably the thread is of square cross section to prevent scoring of the tube being cleaned.

In the form of the apparatus shown in Figure 2 the tool consists of a shaft having a number of eccentrically mounted flexible shafts 1', 2' and 3' pitched equally around 360°. The driving shaft is shown and is marked 4'. The bearings, 10', 11', 14' and 16' are of the split type made in halves each having a hole drilled in it for the reception of the flexible cranks. Both halves of the bearings are connected together by set pins 29', 30', 31' and 32'. The diameters of the bearings 10', 11', 14' and 16' at the center are slightly larger than at the ends to facilitate the entry of the bearings into the tube. The material from which the bearings are manufactured is case-hardened steel.

On each flexible shaft there are one or more solid case-hardened collars 26', 27' and 28'. The inside diameter of the collars is such that they fit loosely on the flexible cranks. The outside diameter of the collars is determined as before by the amount of eccentricity of the cranks and the internal diameter of the tube to be cleaned.

When the complete tools shown in Figures 1 and 2 are rotated at very high speeds, i. e. at least 10,000 revolutions per minute within a tube, the centrifugal force causes the collars to bound and rebound from the surface of the tube thereby causing the scale adhering to the outside surface of the tube to become dislodged.

The complete tools as shown are inserted within the tube to be cleaned and may traverse along the entire length of the tube at the desired speed of the tool (revolutions per minute) but in some cases, it has been found that by inserting the tool at any longitudinal portion of the tube, preferably at the centre, then the act of rotating the tool for a few seconds in that one position causes the adhering scale to become dislodged from substantially the entire length of the tube.

Before using the tool it is advisable to have the scale to be removed, as dry as possible, as then it is more brittle and more easily dislodged. In the case of steam-heated evaporators this may be done by passing steam through the tubes after draining the water from the evaporator.

Any conventional driving apparatus, such as a motor, (not shown) may be used to rotate the tool. The power is applied to the tool by means of a flexible shaft connected at one end to the motor or to a step up gear box driven by the motor and at the other end to the tool. I have found that in practice, due to the relatively high speed at which the tool must be driven i. e. at least 10,000 revolutions per minute, the ordinary type of flexible shaft is rapidly destroyed and is therefore not suitable to be used to drive the tube.

For this reason it has been found advisable to fit bearings at intervals on the flexible shaft and two different types of suitable bearings will now be described.

The first type shown in Figure 3 is a spherical type bearing having journal 33 made of case-hardened steel and attached to the inner shaft 34 by tinned copper wire 35. The bearing 36, is made of phosphor bronze and on the inside; a very fine clearance is allowed for the journal 33 to rotate. The external surface has a fine thread for the reception of phosphor bronze liners 37. These liners are screwed on the bearing and at 38 they are tinned and soldered to the outer metallic sheath of the flexible shaft. The inner flexible shaft is designated 34 and the outer metallic sheath is marked 39 on this drawing.

The other type of bearing shown in Figure 4 is a self-aligning type of ball-bearing. The inner flexible shaft 34 and the outer casing or sheath 39 are shown. A solid steel ring 43 is sweated to the shaft 34. The ball bearing consists of the inner ball race 44 and the ball 45, the outer ball race 46, the ball cage 47, and the self-aligning outer race 48. The inner flexible shaft 34 is continuous from the driving to the driven end. The outer casing or sheath 39 is composed of sections which are spaced between the ball bearing races. Shoulders 49 and 50 are shrunk on sheath 39 or sheath 39 may be expanded into 49 and 50 and in addition they may be pinned. Shoulder 50 is provided with a fine thread at 51, and the diameter at the bottom of this thread is slightly larger than the external diameter of the outer self-aligning race 48. Between the shoulders 49 and 50 and outer race 48, packings or shims 52 are inserted. These packings or shims are shown of the spring type but they may be of the plate type. They are inserted to allow for adjustment of the stretch which usually occurs with the outer casings of flexible shafts. An outer ring nut 53 is screwed at 51, to the shoulder 50, and this ring nut has holes 54 drilled in it to fit a ring type spanner. The act of screwing the ring nut 53 on shoulder 50 securely fixes parts 44, 45, 46, 47, 48, 49, 50, 52 and 53, thus making a continuous outer casing.

As many apparently widely different embodiments of this invention may be made without departing from the spirit and scope thereof, it is to be understood that we do not limit ourselves to the specific embodiments thereof except as defined in the appended claims.

We claim:

1. Apparatus for descaling metal tubes comprising a rigid rotary crank shaft having one or more cranks of small throw formed thereon, a number of loosely fitting rings on said cranks, the said crank shaft and rings being adapted to be inserted in the tube to be descaled, and means for rotating said crank shaft at high speed.

2. Apparatus for descaling metal tubes comprising a rotary shaft consisting of a number of flexible shafts mounted eccentrically end to end with intermediate couplings, a number of loosely fitting collars on said flexible shafts, the rotary shaft and collars being adapted to be inserted in the tube to be cleaned, and means for rotating the shaft at high speed.

3. Apparatus for descaling metal tubes comprising a rotary crank shaft having a number of cranks of small throw formed thereon, bearings mounted between each pair of cranks and at the extremities of the crank shaft, said bearings having sliding fit within the tubes to be descaled, a number of loosely fitting rings on the cranks, said crank shaft, rings and bearings being adapted to be inserted in the tube to be descaled, and means for rotating the crank shaft at high speed.

4. Apparatus for descaling metal tubes comprising a rotary crank shaft having three cranks of small throw formed thereon and pitched equally round 360°, bearings mounted between each pair of said cranks and at the extremities of the crank shaft, said bearings having a sliding fit within the tubes to be descaled, a plurality of loosely fitting collars on said cranks, said crank shaft with collars and bearings being adapted to be inserted in the tubes to be descaled, and means for rotating the crank shaft at high speed.

5. A dynamically balanced tool for descaling the surfaces of metal tubes comprising a rotary shaft provided with cranks of small throw intermediate its ends, bearings on said shaft intermediate the cranks, said bearings adapted to have a snug fit within the tubes to be descaled and a series of loosely fitting, smoothed faced, hardened steel rings mounted on said cranks and adapted to strike the walls of the tube in which the tool is introduced when the tool is rotated.

In testimony whereof we affix our signatures.

JOHN JOHNSTON.
FRED ABLARD.